United States Patent
Lin et al.

(10) Patent No.: US 7,099,760 B2
(45) Date of Patent: Aug. 29, 2006

(54) ACTIVE WHEEL STEERING CONTROL

(75) Inventors: William C. Lin, Troy, MI (US);
Shih-Ken Chen, Troy, MI (US);
Yuen-Kwok Chin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 205 days.

(21) Appl. No.: 10/828,074

(22) Filed: Apr. 20, 2004

(65) Prior Publication Data

US 2005/0234621 A1    Oct. 20, 2005

(51) Int. Cl.
*B62D 5/04*    (2006.01)

(52) U.S. Cl. .............................. 701/41; 701/42; 701/70; 180/445; 180/197; 303/146; 303/139

(58) Field of Classification Search .................. 701/70, 701/41, 42, 1, 36, 38; 180/408, 413, 40, 180/446, 410, 445, 443, 197, 204, 412, 444; 280/5.502, 91; 340/440; 303/146, 139, 303/172, 113.2
See application file for complete search history.

(56) References Cited

U.S. PATENT DOCUMENTS

| | | | | |
|---|---|---|---|---|
| 5,615,117 | A * | 3/1997 | Serizawa | 701/42 |
| 6,959,970 | B1 * | 11/2005 | Tseng | 303/146 |
| 2002/0198646 | A1 * | 12/2002 | Bedner et al. | 701/48 |
| 2003/0130775 | A1 * | 7/2003 | Lu et al. | 701/36 |
| 2004/0070268 | A1 * | 4/2004 | Baumgarten | 303/146 |
| 2005/0189163 | A1 * | 9/2005 | Barton et al. | 180/446 |
| 2005/0209762 | A1 * | 9/2005 | Lu et al. | 701/70 |

* cited by examiner

*Primary Examiner*—Jack Keith
*Assistant Examiner*—Tuan C To
(74) *Attorney, Agent, or Firm*—Kathryn A. Marra

(57) ABSTRACT

A control system that employs closed-loop control for providing active vehicle rear-wheel steering, where the control system receives longitudinal wheel slip inputs to improve the vehicle directional stability. The longitudinal wheel slip inputs can be from one or more of wheel speed, traction control on and automatic braking system on. The control system includes an open-loop controller for generating an open-loop steering control signal, a yaw rate feedback controller for generating a yaw rate feedback signal, and a side-slip rate controller for generating a side-slip rate feedback signal. The open-loop steering control signal, the yaw rate feedback signal and the side-slip rate feedback signal are combined to generate the steering control signal to steer the vehicle rear wheels.

27 Claims, 16 Drawing Sheets

ACTIVE WHEEL STEERING CONTROL

BACKGROUND OF THE INVENTION

1. Field of the Invention

This invention relates generally to closed-loop control for active vehicle wheel steering and, more particularly, to closed-loop control for active front wheel steering or active rear wheel steering, where the closed-loop control uses longitudinal wheel slip to improve the vehicle's directional stability.

2. Discussion of the Related Art

It is known in the art to employ automatic rear-wheel vehicle steering based on vehicle dynamic information during a vehicle turn, or yaw, to enhance the vehicle stability. Active wheel steering control of a vehicle can improve vehicle stability over a conventional vehicle with only two steerable front wheels. The rear wheel steering assist can be in-phase steering or out-of-phase steering. In-phase rear wheel steering steers the rear wheels in the same direction as the front wheels, and is typically provided at higher vehicle speeds. Out-of-phase rear wheel steering steers the rear wheels in an opposite direction as the front wheels to provide a tighter turning radius, and is typically provided at lower vehicle speeds.

Open-loop automatic rear-wheel steering provides a certain amount of rear-wheel steering assist depending on the amount of front-wheel steering provided by the vehicle operator. In other words, a predetermined function is used to turn the rear wheels a certain amount in response to the turning of the front wheels at a particular vehicle speed. It is known to provide closed-loop automatic rear-wheel steering based on feedback in the event that the vehicle is not following the steering path requested by the vehicle operator. For example, slippery road conditions may prevent the vehicle from turning in the desired direction because the wheels may slip along the road surface. Further, the vehicle's rear quarter may "fish-tail," also providing a different turn angle than was intended. Closed-loop rear-wheel steering assist systems sense the actual vehicle yaw rate and the intended yaw rate, and generate a gain signal that provides the steering assist by the rear wheels if the vehicle yaw rate and the intended yaw rate are not the same.

When the vehicle wheels are turned, the lateral force between the roadway and the vehicle wheels causes the vehicle to turn. The greater the lateral force, the quicker the vehicle will turn in the desired direction. However, the vehicle wheels will always travel at least partially in a longitudinal direction relative to the traveling direction of the vehicle. The wheel slip angle is the difference between the steering direction of the vehicle and the actual direction of the vehicle. A small amount of wheel turning allows the vehicle to go in the intended direction more quickly because the lateral force is the greatest. The lateral force is reduced if the vehicle steer angle is greater than a certain amount relative to the travel direction of the vehicle, depending on road conditions, type of tire, etc.

A vehicle wheels longitudinal slip is the amount of slip the wheel has relative to the roadway in the direction that the vehicle is traveling. The greater the longitudinal slip, the less the lateral force is available to turn the vehicle. The longitudinal slip is defined as the ratio between the wheel rotation speed and the vehicle speed.

Known rear-wheel steering assist systems are based on the assumption that there is no longitudinal slip in the rear wheels, and thus the lateral force is at a maximum. In the known systems, if the longitudinal slip reduced the ability of the wheels to provide the intended yaw rate, additional gain was added to increase the rear wheel steering assist, which would reduce the lateral force available to provide the steering.

A closed-loop control system for rear-wheel steering is disclosed in U.S. patent application Ser. No.10/305,378, filed Nov. 26, 2002, titled "Method and Apparatus for Vehicle Stability Enhancement System," assigned to the assignee of this application and herein incorporated by reference. It was recognized in the '378 application that when the vehicle is operated in a two-wheel drive (2WD) mode or a four-wheel drive (4WD) mode, the wheel capability at the rear wheels is different because of the different amount of longitudinal force exerted on the wheel. This affects the lateral force capability, and thus, the '378 control provides control gains dependent on the selection of vehicle operation of 2WD and 4WD to result in a best over all vehicle performance.

Even though the tire force capability for 2WD and 4WD is different statistically, a control process optimized based on the selection of such operation still has room for improvement due to the fact that the precise amount of longitudinal force, and subsequently, the lateral force capability, exerted at the wheel is not only determined by the 2WD/4WD gear selection, but by the driver's operation of the accelerator pedal and the brake pedal. It would be beneficial to provide a closed-loop rear-wheel steering control system that utilized longitudinal wheel force to determine the proper amount of control gain for the rear-wheel steering to reflect the need of a different steering control under various situations of vehicle operation.

SUMMARY OF THE INVENTION

In accordance with the teachings of the present invention, a control system is disclosed that employs closed-loop control for providing active vehicle rear-wheel steering, where the control system receives longitudinal wheel slip inputs to improve the vehicle directional stability. The control system includes an open-loop controller for generating an open-loop steering control signal, a yaw rate feedback controller for generating a yaw rate feedback signal, and a side-slip rate controller for generating a side-slip rate feedback signal. The open-loop steering control signal, the yaw rate feedback signal and the side-slip rate feedback signal are combined to generate the steering control signal for steering the vehicle rear wheels.

The yaw rate feedback controller includes a proportional control process block that generates a rear-wheel steering proportional control signal to determine the yaw rate feedback signal. The rear-wheel steering proportional control signal is determined based on wheel longitudinal slip from one or more of the driven wheel speed, whether the automatic braking system is on or off, and whether the traction control system is on or off. The side-slip rate feedback controller includes a proportional control process block that generates a side-slip rate control component signal to determine the side-slip rate feedback signal. The side-slip rate control component signal is determined based on wheel longitudinal slip from one or more of the driven wheel speed, whether the automatic braking system is on or off, and whether the traction control system is on or off.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a closed-loop control for active vehicle wheel steering including longitudinal wheel slip inputs is merely exemplary in nature, and is in no way intended to limit the invention or its applications or uses.

Figure 1:
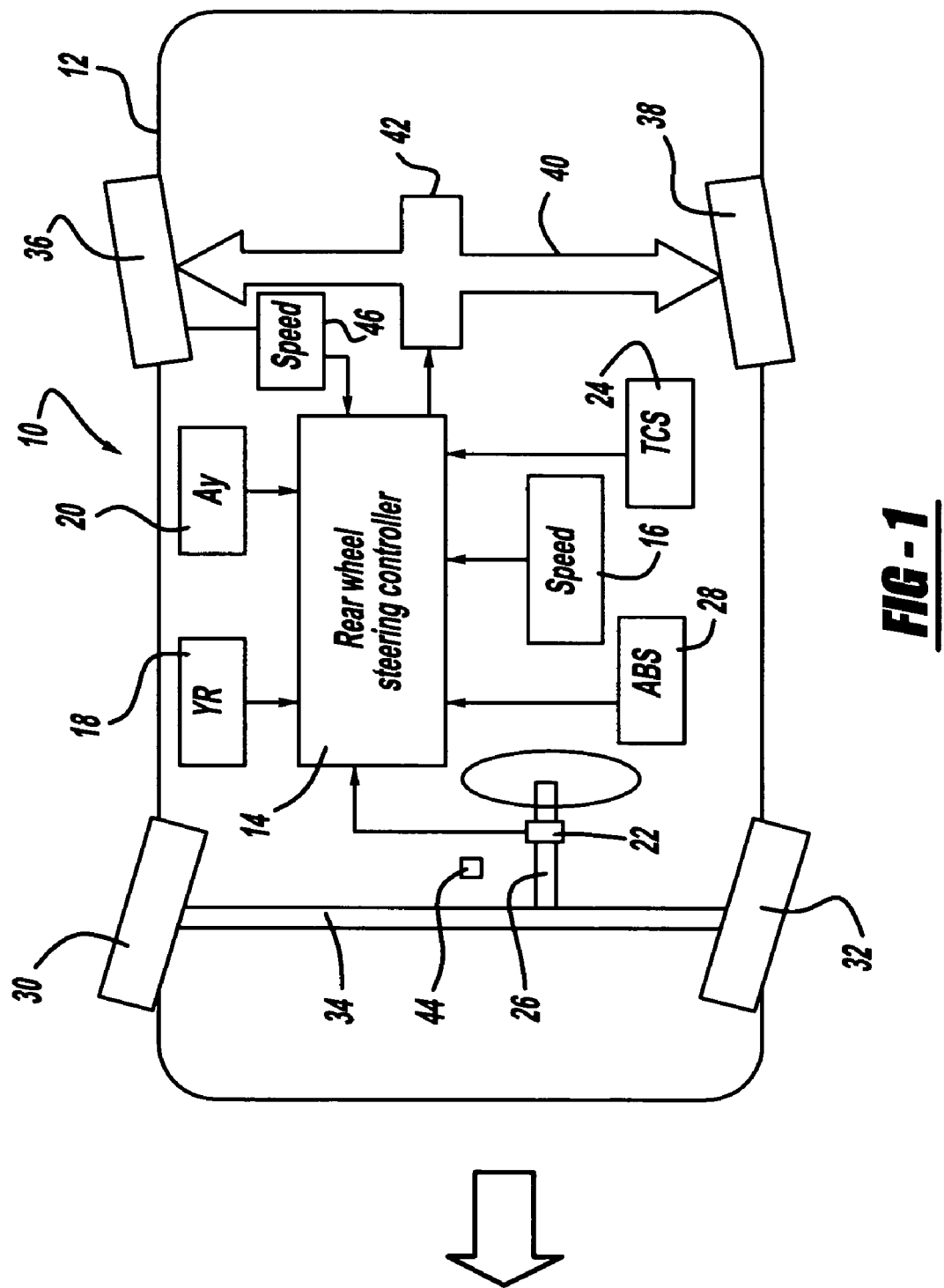
FIG. 1 is a plan view of a vehicle that includes a controller for providing active rear-wheel steering, where the controller employs yaw-rate feedback and side-slip rate feedback using longitudinal wheel slip inputs, according to an embodiment of the present invention.

FIG. 1 is a plan view of a vehicle 12 that includes an active rear-wheel steering control system 10 using yaw rate feedback control and side-slip rate feedback control, according to an embodiment of the present invention. The system 10 includes a rear-wheel steering controller 14 that receives inputs of a vehicle speed signal V from a vehicle speed sensor 16, a vehicle yaw rate signal YR from a yaw rate sensor 18, a vehicle lateral acceleration signal Ay from a lateral acceleration sensor 20, a steering wheel angle position signal from a steering wheel angle sensor 22, an automatic braking system (ABS) activated signal from an ABS 28, a traction control system (TCS) activated signal from a TCS 24, and a wheel speed signal from a wheel speed sensor 46. The vehicle speed sensor 16, the wheel speed sensor 46, the yaw rate sensor 18 and the lateral acceleration sensor 20 can be any sensor suitable for the purposes described herein, and one skilled in the art would recognize various examples. Although only the wheel 36 is shown with a wheel speed sensor, all of the wheels 30, 32, 36 and 38 would have speed sensors as may be required by the invention discussed below. The wheel speed sensor 46 measures the rotational speed of the wheel 36, which is converted to a translational speed. The steering wheel sensor 22 is mounted to a steering wheel column 26, and can also be any steering wheel angle sensor suitable for the purposes described herein.

As will be discussed in detail below, the controller 14 employs an open-loop control algorithm, a yaw rate feedback control algorithm and a side-slip rate feedback control algorithm for providing active rear-wheel steering, where the feedback control algorithms use inputs for determining longitudinal wheel slip.

The vehicle 12 includes front wheels 30 and 32 rotatably mounted to a front axle 34, and rear wheels 36 and 38 rotatably mounted to a rear-wheel axle 40. The rear wheel steering actuator 42 also provides a signal to the controller 14 of the rotational speed of the wheels 36 and 38. A trailer mode selection switch 44 allows the vehicle operator to notify the controller 14 when the vehicle 12 is towing a trailer.

Figure 2:
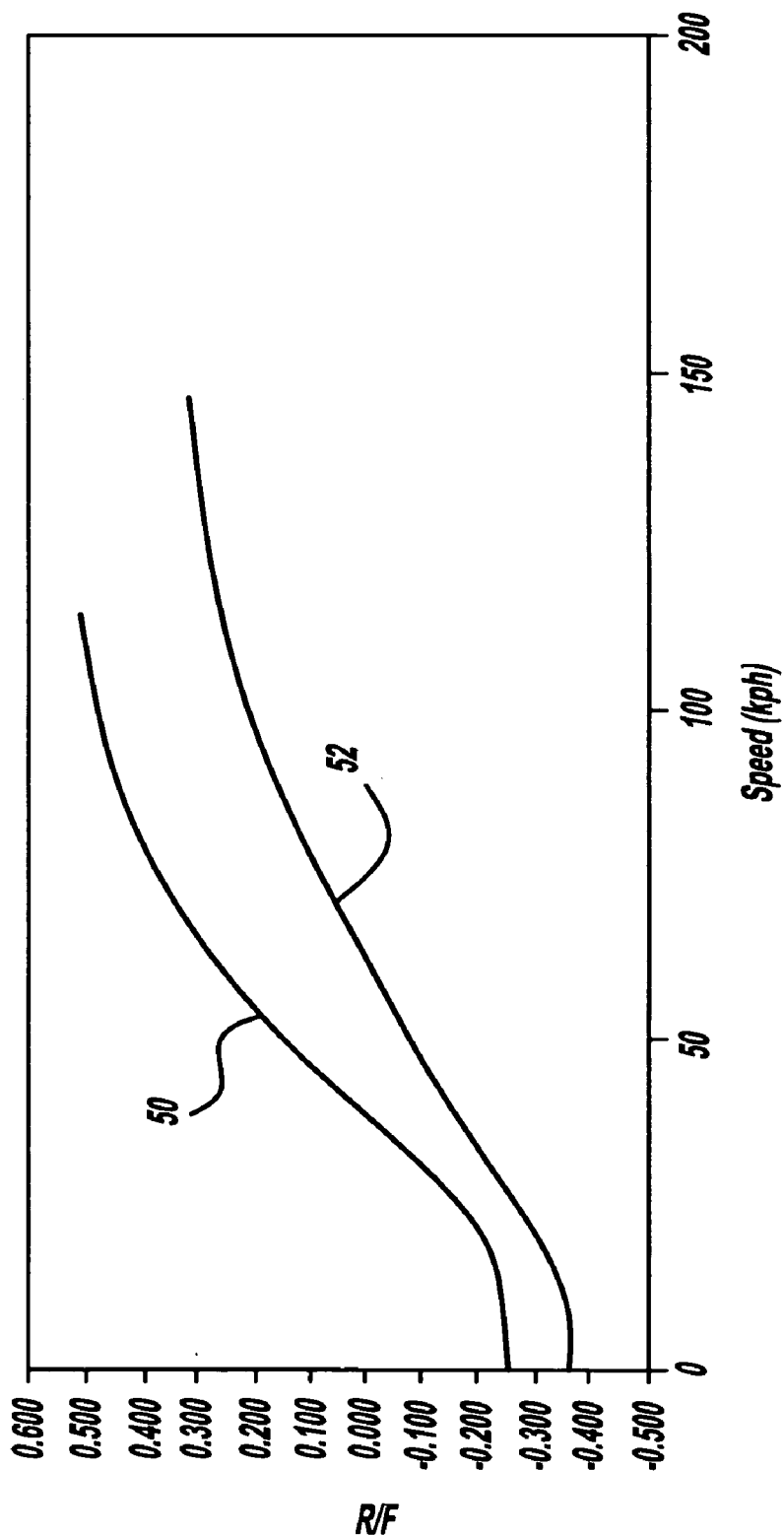
FIG. 2 is a graph with vehicle speed on the horizontal axis and rear-wheel steering angle (R/F) on the vertical axis showing a typical gain schedule for open-loop active rear-wheel steering.

FIG. 2 is a graph with the vehicle speed V on the horizontal axis and rear-wheel steering angle (R/F) on the vertical axis showing typical rear-wheel steering angles for an open-loop rear-wheel steering assist system. Graph curve 50 is for a vehicle that is not towing a trailer, and graph curve 52 is for a vehicle that is towing a trailer. The steering angle graph curves 50 and 52 show that for slower speeds, typically below 50 kph, the rear-wheel steering is out-of-phase with the front wheel steering, and above 50 kph, the rear-wheel steering is in-phase with the front wheel steering. The information from the graph can be provided in a look-up table for the controller 14.

The present invention is a rear-wheel steering control process that provides a precise control gain for yaw rate feedback and side-slip rate feedback through the determination of the wheel lateral force capability. When the driven rear wheels 36 and 38 are subject to longitudinal forces generated by vehicle accelerating or braking, the wheels 36 and 38 will have less capability to generate the lateral force. From this it is known that the wheels 36 and 38 need to be steered more produce the same amount of lateral force. Thus, the present invention employs a technique for optimal determination of rear-wheel steering control gains.

When the vehicle 12 is subject to an antilock braking control or traction control, the wheels 30, 32, 36 and 38 are controlled at a point where the longitudinal tire capability is the maximum or the lateral capability is somewhat reduced from that of a free-rolling wheel. Therefore, when the ABS 28 or the TCS 24 is active, it is an indication that the tire lateral force capability is reduced. As a result, a higher gain, typically increased by an amount of 10–20% from its normal value can help the vehicle 12 to maintain the expected optimal dynamic performance.

The capability of wheel longitudinal force can also be estimated based on the wheel slip. When the vehicle 12 is subject to braking, the wheel slip is calculated as:

$$\lambda = 1 - \frac{\omega R}{V}, \quad (1)$$

where $\lambda$ is wheel slip, $\omega$ is the angular speed or wheel rotation, R is the wheel radius, and V is the vehicle speed. When the vehicle 12 is subject to acceleration, the wheel slip $\lambda$ can be calculated as:

$$\lambda = 1 - \frac{V}{\omega R} \quad (2)$$

It is generally recognized that as the wheel longitudinal slip increases, the lateral force capability is reduced, especially when the wheel slip exceeds a critical threshold that generates the maximum longitudinal force. Therefore, the present invention utilizes the information of wheel longitudinal slip to adjust the control gains for rear-wheel steering control.

Figure 3:
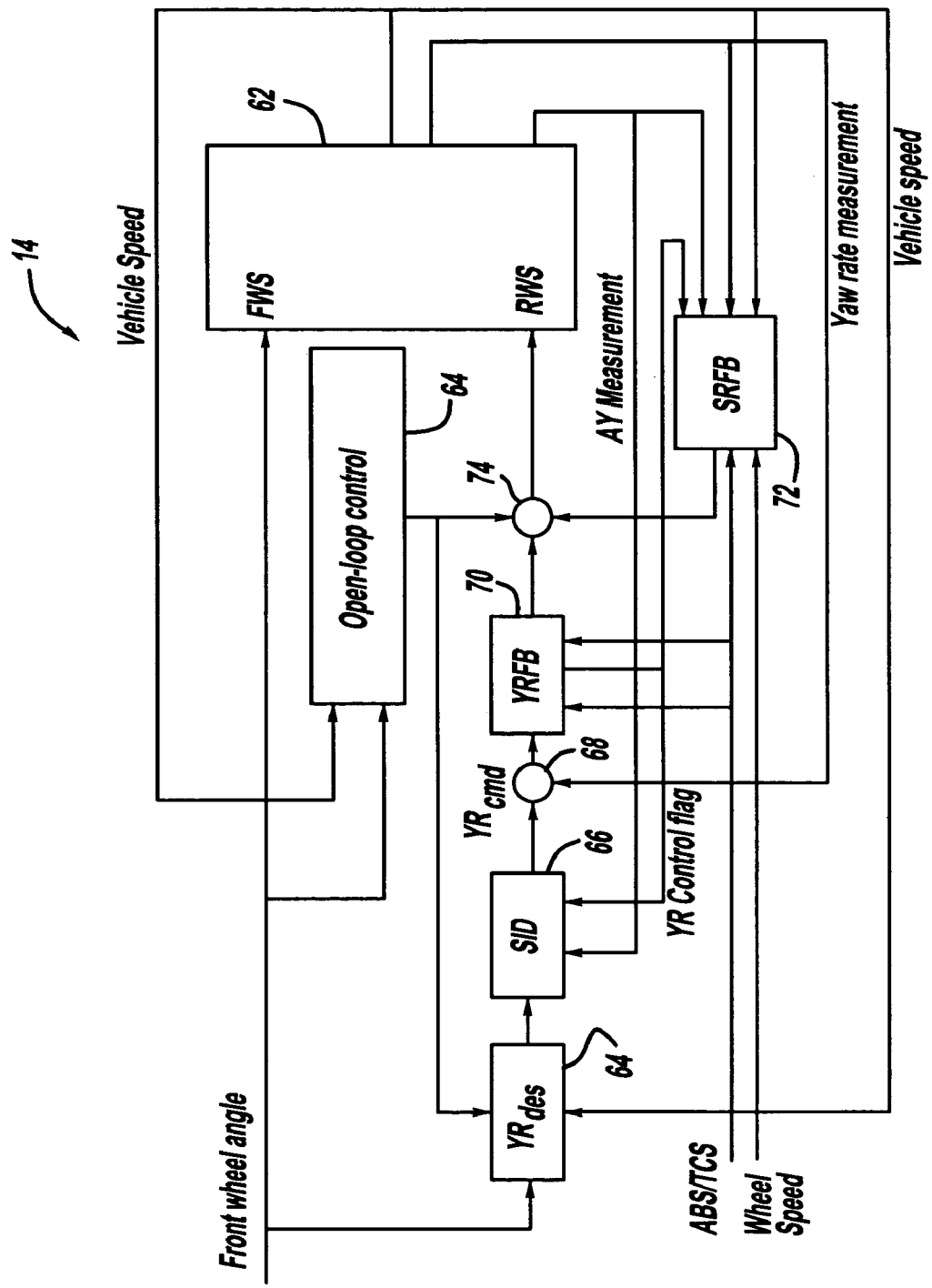
FIG. 3 is a block diagram of the controller shown in FIG. 1.

FIG. 3 is a block diagram of the controller 14 for providing rear-wheel steering, according to an embodiment of the present invention. The controller 14 includes a vehicle steering system 62 that receives a front wheel steering (FWS) input and a rear wheel steering (RWS) input. The FWS input is generated by the front wheel angle signal from the sensor 22. An open-loop control process block 64 is provided for the open-loop steering of the vehicle 62. The open-loop control process block 64 receives the front wheel steering angle signal from the sensor 22 and the vehicle speed signal V from the sensor 16, and uses the information from the graph in FIG. 2 to generate an open-loop rear-wheel steering control signal.

The open-loop rear-wheel steering signal can be combined with a yaw rate feedback signal and a side-slip rate feedback signal to provide closed-loop control to enhance vehicle stability. The front wheel steering angle signal, the open-loop control rear-wheel steering signal and the vehicle speed signal V are applied to a desired yaw rate process block 64 to provide the closed-loop control. The output of the process block 64 is a desired yaw rate signal $YR_{des}$ that includes the assumption that the roadway surface has a high coefficient of friction, i.e., is not slippery. The desired yaw rate signal $YR_{des}$ is applied to a surface identification (SID) process block 66 that modifies the desired yaw rate signal $YR_{des}$ based on the road condition. In this embodiment, the road condition is determined from the lateral acceleration signal Ay. However, several techniques are known in the art for determining the surface condition, and any suitable one of those techniques can be used herein.

Figure 4:
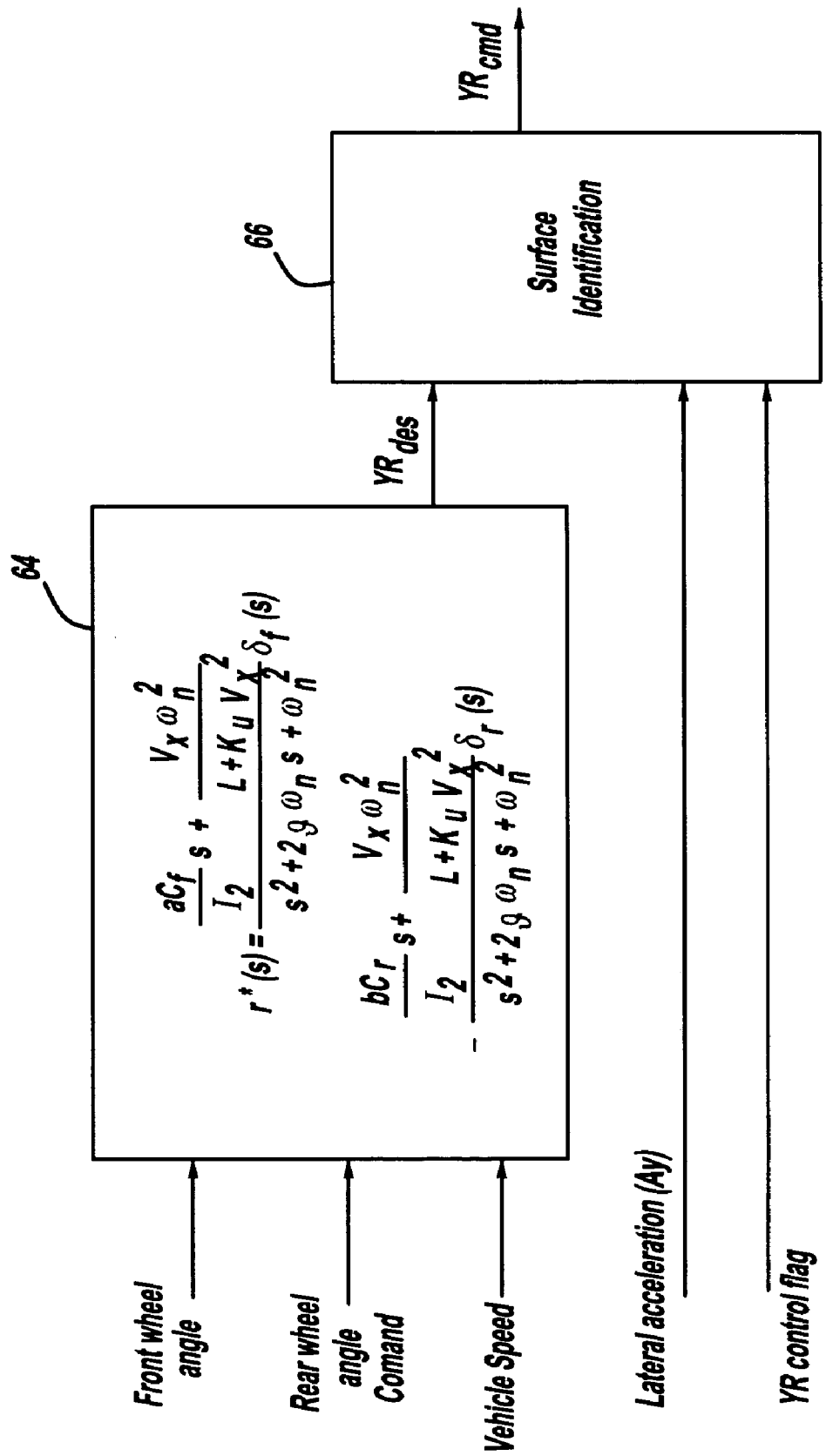
FIG. 4 is a block diagram of a yaw rate process block and a surface identification process block in the controller shown in FIG. 3.

FIG. 4 is a more detailed block diagram of the yaw rate process block 64 and the SID process block 66. In FIG. 4, a high coefficient yaw rate reference model algorithm is shown for determining the desired yaw rate signal $YR_{des}$. The SID process box 66 generates a yaw rate command signal $YR_{cmd}$ from the inputs. A more detailed discussion of the process blocks 64 and 66 can be found in the '378 application.

The yaw rate command signal $YR_{cmd}$ and the yaw rate signal YR from the yaw rate sensor 18 are applied to a yaw comparator 68. The yaw comparator 68 compares the desired yaw rate command signal $YR_{cmd}$ and the yaw rate signal YR to determine whether the vehicle 12 is actually turning at the rate desired by the vehicle operator. The difference between the commanded yaw rate signal $YR_{cmd}$ and the actual yaw rate signal YR is a yaw rate correction signal YRE that is applied to a yaw rate feedback process block 70. The process block 70 determines what steering correction is necessary to provide the desired yaw rate.

Figure 5:
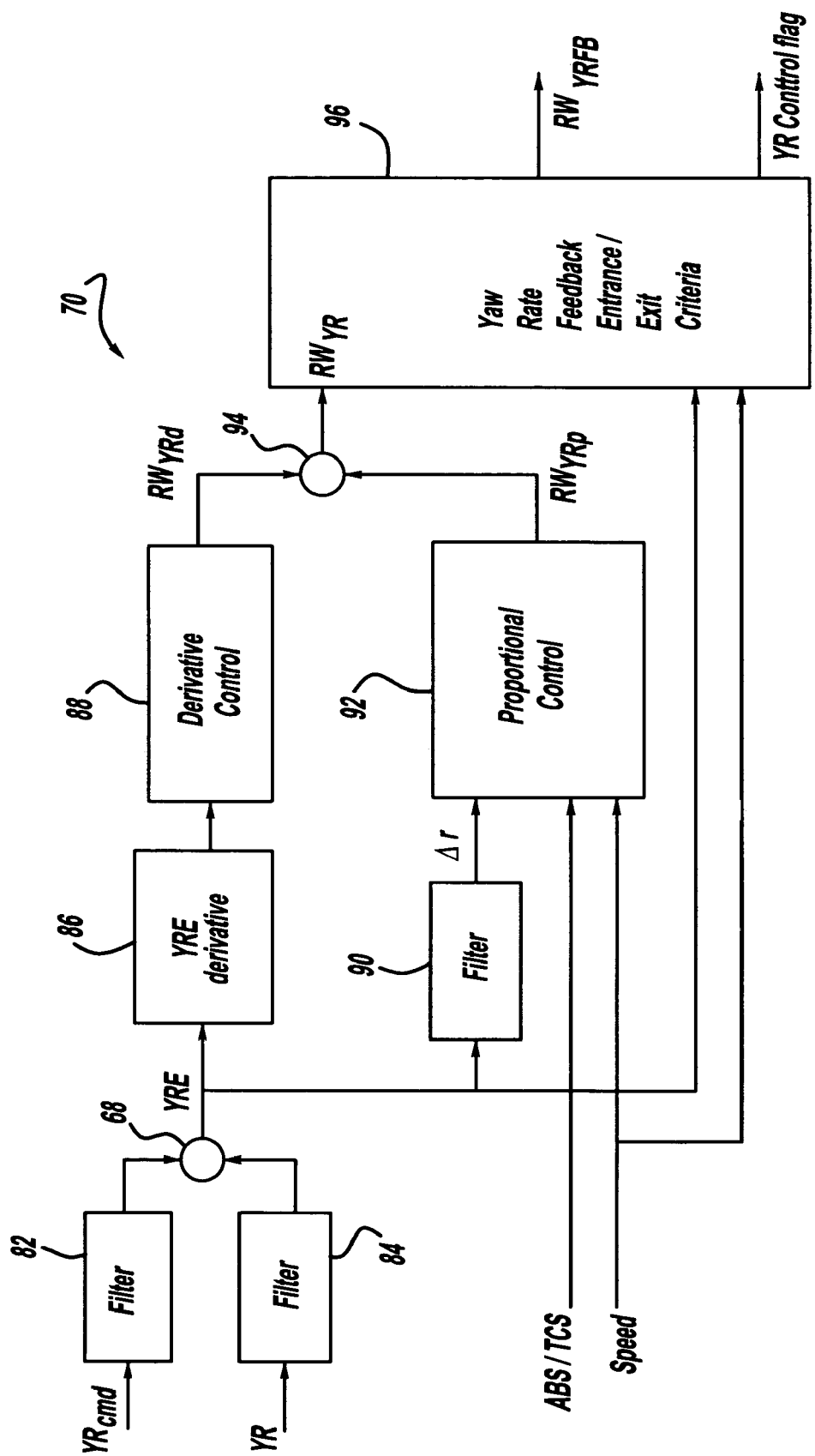
FIG. 5 is a block diagram of a yaw rate feedback process block in the controller shown in FIG. 3, according to one embodiment of the present invention.

FIG. 5 is a block diagram of the yaw rate feedback process block 70, according to one embodiment of the present invention. The yaw rate command signal $YR_{cmd}$ is filtered by a filter 82 and the yaw rate signal YR is filtered by a filter 84 to reduce signal noise. The yaw rate feedback process block 70 includes a yaw rate error derivative process block 86, a yaw rate error derivative control process block 88, a filter 90 and a proportional control process block 92. The process block 86 generates a time derivative of the yaw rate error signal YRE, and the process block 88 calculates a derivative control signal $RW_{YRd}$ by multiplying the time derivative signal by a constant predetermined gain factor.

The yaw rate error signal YRE is filtered by the filter 90 to generate a filtered yaw rate error signal $\Delta r$ that is applied to the proportional control process block 90. According to the invention, the proportional control process block 92 receives the ABS status signal from the ABS 28, the TCS status signal from the TCS 24 and the vehicle speed signal V from the vehicle speed sensor 16, and generates a rear-wheel steering proportional control signal $RW_{YRp}$. The derivative control signal $RW_{YRd}$ and the rear-wheel steering proportional control signal $RW_{YRp}$ are added by a combiner 94 to generate a rear-wheel yaw rate control signal $RW_{YR}$. The yaw rate control signal $RW_{YR}$, the error rate signal $\Delta r$ and the vehicle speed signal V are applied to a yaw rate process block 96 that determines yaw rate entrance and exit criteria, and generates the yaw rate feedback signal $RW_{YRFB}$. The yaw rate process block 96 also outputs a yaw rate control flag that the difference between the desired yaw rate and the actual yaw rate is great enough to use the closed-loop control.

Figure 6:
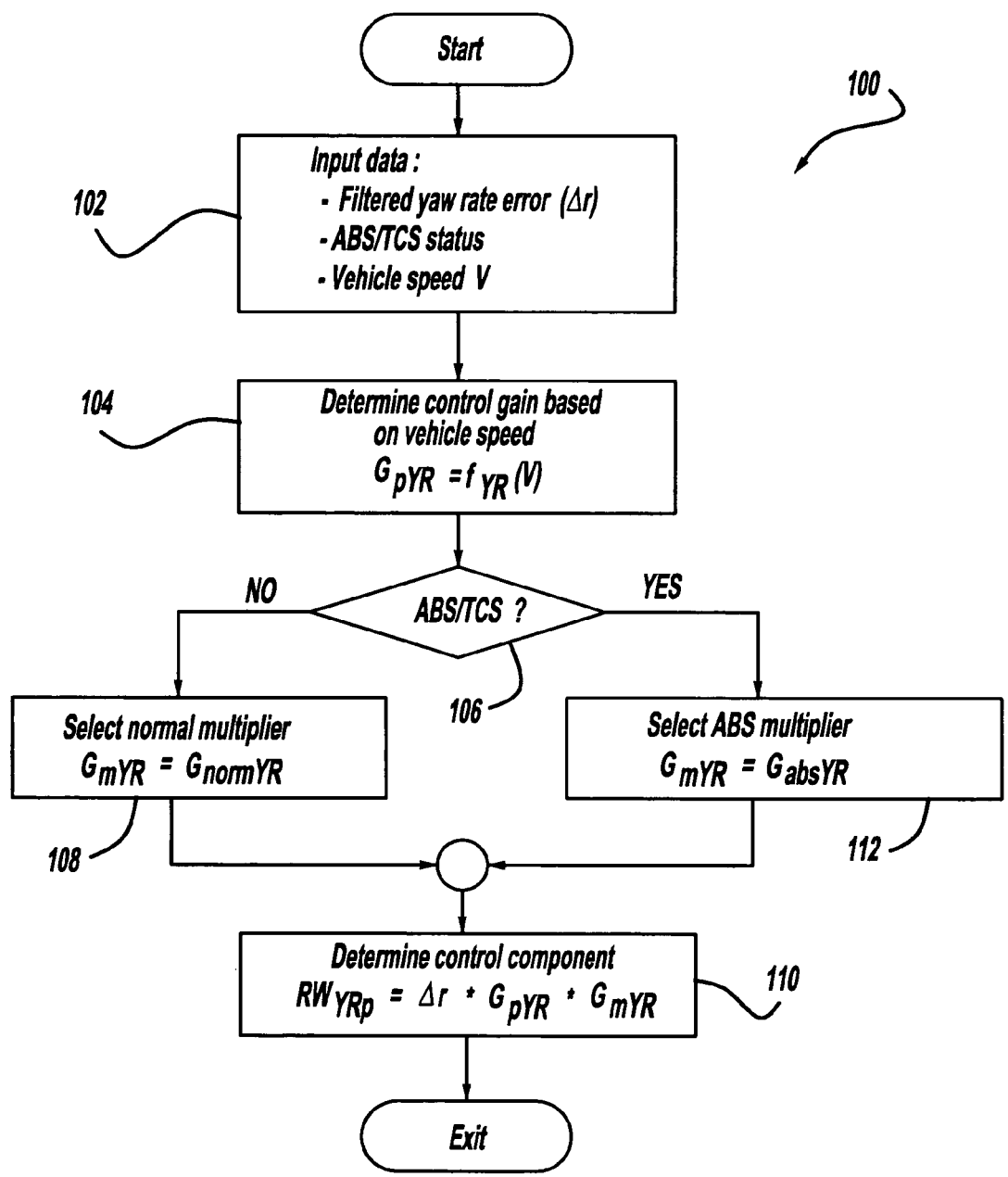
FIG. 6 is a flow chart diagram for determining a control component for the yaw rate feedback process block shown in FIG. 5.

FIG. 6 is a flow chart diagram 100 showing the operation of the proportional control process block 92 for this embodiment. The filtered yaw error rate signal $\Delta r$, the ABS and TCS status signals and the vehicle speed signal V are input into the proportional control process block 92 at box 102. The proportional control algorithm then determines a proportional yaw rate control gain $G_{pYR}$ based on vehicle speed $f_{YR}(V)$ at box 104. A pre-stored look-up table is provided for this purpose. The proportional control algorithm then determines whether the ABS 28 or TCS 24 is activated at decision diamond 106. If neither the ABS 28 nor TCS 24 is activated, then the algorithm selects a normal predetermined rear-wheel steering gain multiplier $G_{normYR}$ for a gain multiplier $G_{mYR}$ at box 108. The proportional control algorithm determines the rear-wheel steering proportional control signal $RW_{YRp}$ at box 110 by multiplying the yaw rate control gain $G_{pYR}$, the error rate signal $\Delta r$ and the gain multiplier $G_{mYR}$. However, if the proportional control algorithm determines that the ABS 28 or TCS 24 is activated at the decision diamond 106, then the algorithm selects a predetermined longitudinal wheel slip gain multiplier $G_{absYR}$ for the gain multiplier $G_{mYR}$ at box 112, which is used to determine the rear-wheel steering proportional control signal $RW_{YRp}$ at the box 110. The gain multiplier $G_{absYR}$ provides the correction for longitudinal wheel slip.

The controller 14 also includes a side-slip rate control feedback process block 72 that determines the vehicle condition during the turning maneuver. The side-slip rate control feedback process box 72 receives the lateral accelerometer signal Ay from the lateral acceleration sensor 20, the yaw rate signal YR from the yaw rate sensor 18, the vehicle speed signal V from the vehicle speed sensor 16, the yaw rate error signal YRE, the ABS and TCS status signals, and the YR control flag to make the determination of the vehicle condition.

Figure 7:
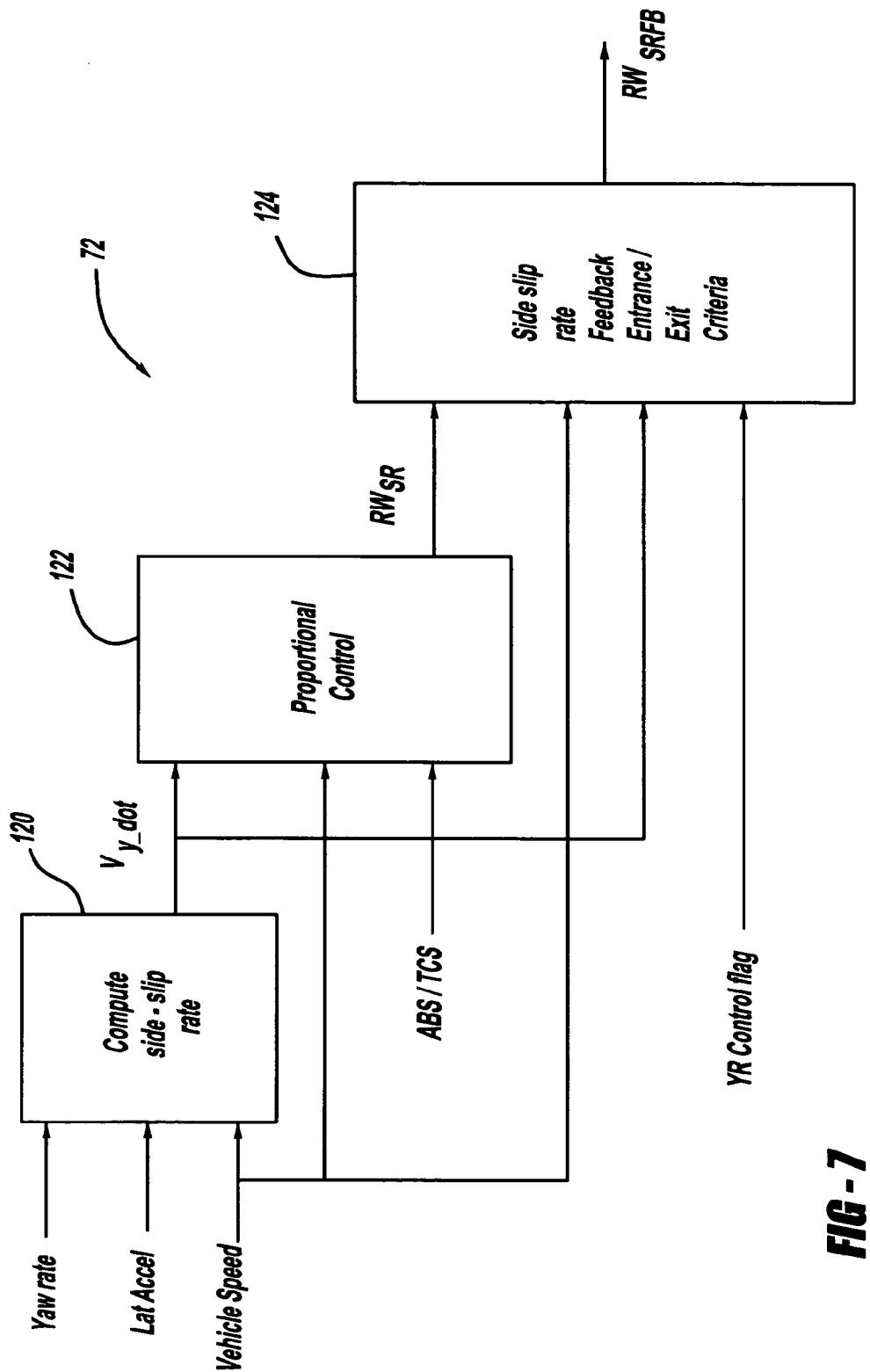
FIG. 7 is a block diagram of a side-slip rate feedback process block in the controller shown in FIG. 3, according to one embodiment of the present invention.

FIG. 7 is a detailed block diagram of the side-slip rate control process block 72, according to one embodiment of the present invention. The process block 72 includes a side-slip rate process block 120, a proportional control process block 122 and a side-slip rate feedback process block 124. The side-slip rate control process block 120 receives the yaw rate signal YR from the yaw rate sensor 18, the lateral acceleration signal Ay from the lateral acceleration sensor 20 and the vehicle speed signal V from the vehicle speed sensor 16, and generates a vehicle side-slip rate signal $V_{y\_dot}$ ($V_{y\_dot}$=Ay−YR*V). The proportional control process block 122 receives the side-slip rate signal $V_{y\_dot}$, the vehicle speed signal V, the ABS signal from the ABS 28 and the TCS signal from the TCS 24, and generates a rear-wheel side-slip rate control component $RW_{SR}$. The rear-wheel side-slip rate control component $RW_{SR}$, the vehicle side-slip rate signal $V_{y\_dot}$, the vehicle speed signal V and the yaw rate control flag are applied to the side-slip rate feedback process block 124 that determines side-slip rate entrance and exit criteria, and generates a side-slip rate feedback signal $RW_{SRFB}$.

Figure 8:
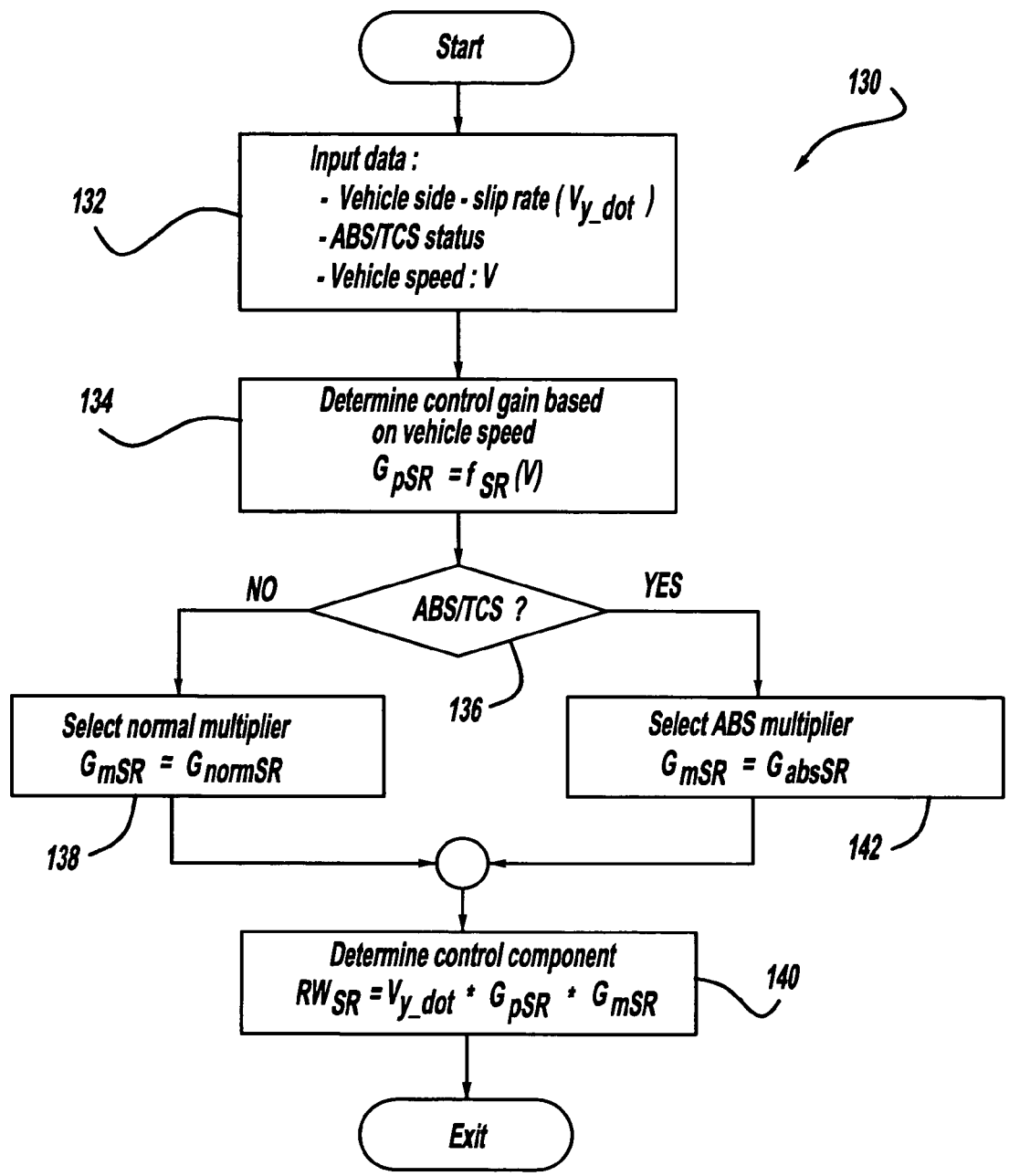
FIG. 8 is a flow chart diagram for determining a control component for the side-slip rate feedback process block shown in FIG. 7.

FIG. 8 is a flow chart diagram 130 showing the operation of the proportional control process block 122 for this embodiment. The vehicle side-slip rate signal $V_{y\_dot}$, the ABS and TCS status signals and the vehicle speed V are input into the proportional control process block 122 at box 132. The proportional control algorithm then determines a proportional side-slip rate control gain $G_{pSR}$ based on the vehicle speed $f_{SR}(V)$ at box 134. A pre-stored look-up table is provided for this purpose. The proportion control algorithm then determines whether the ABS 28 or the TCS 24 is activated at decision diamond 136. If neither the ABS 28 nor TCS 24 is activated, then the algorithm selects a predetermined normal side-slip rate gain multiplier $G_{normSR}$ for the side-slip rate gain multiplier $G_{mSR}$ at box 138. The proportional control algorithm determines the rear-wheel side-slip rate control component $RW_{SR}$ at box 140 by multiplying the vehicle side-slip rate signal $V_{y\_dot}$, the proportional side-slip rate control gain $G_{pSR}$ and the side-slip rate gain multiplier $G_{mSR}$. However, if the proportional control algorithm determines that the ABS 28 or the TCS 24 is activated at decision diamond 136, then the algorithm selects a predetermined side-slip rate gain multiplier $G_{absSR}$ for the gain multiplier $G_{mSR}$ at box 142, which is used to determine the rear-wheel side-slip rate control component $RW_{SR}$ at the box 140. The gain multiplier $G_{absSR}$ provides the correction for longitudinal wheel slip.

Returning to FIG. 3, the controller 14 includes a combiner 74 that adds the open loop control signal, the yaw rate feedback signal $RW_{YRFB}$ and the side-slip rate control feedback signal $RW_{SRFB}$ to generate a rear-wheel steering angle signal RWS. The rear-wheel steering angle signal RWS is used by the controller 14 to control the actuator 42 to provide the rear-wheel steering assist, which includes inputs based on wheel longitudinal slip as discussed above.

Figure 9:
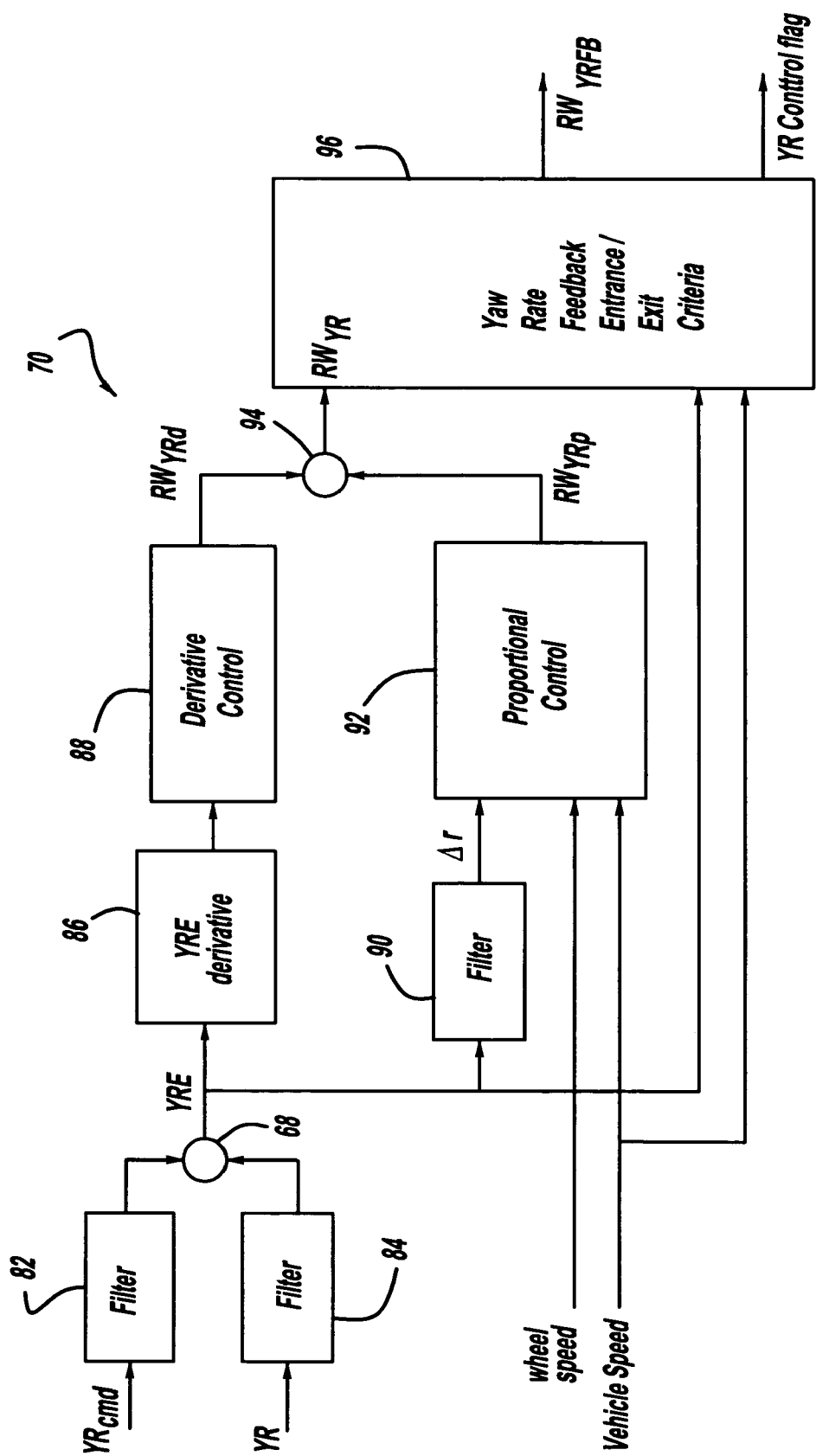
FIG. 9 is a block diagram of a yaw rate feedback process block in the controller shown in FIG. 3, according to another embodiment of the present invention.

According to another embodiment of the present invention, the longitudinal wheel slip is determined by driven wheel speed from the sensor 46 instead of status signals from the ABS 28 and the TCS 24. FIG. 9 is a block diagram of the process block 70 showing this embodiment of the invention. In this embodiment, the proportional gain control process block 92 receives the vehicle driven wheel speed signal instead of the ABS and TCS signals Therefore, the proportional control process block 92 determines the rear-wheel steering proportional control signal $RW_{YRp}$ based on the driven wheel speed signal.

Figure 10:
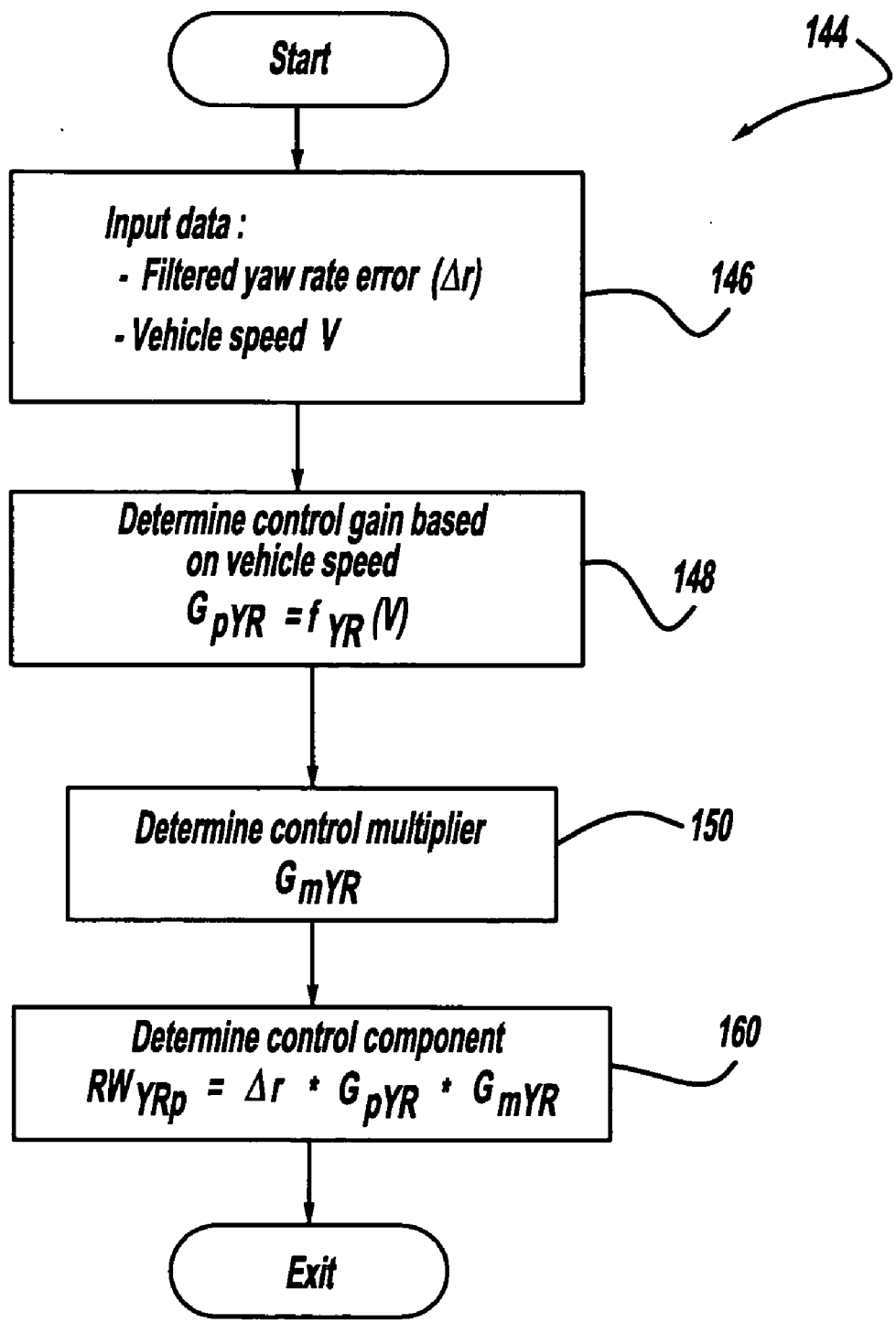
FIG. 10 is a flow chart diagram for determining a control component for the yaw rate feedback process block shown in FIG. 9.

FIG. 10 is a flow chart diagram 144 showing the steps the proportional control algorithm performs to determine the rear-wheel steering proportional control signal $RW_{YRp}$ based on the driven wheel speed for this embodiment. The proportional control algorithm receives input data of the filtered yaw rate error signal Δr and the vehicle speed V at box 146. The proportional control algorithm then determines a proportional yaw rate control gain $G_{pYR}$ based on the vehicle speed $f_{YR}(V)$ at box 148 from a predetermined stored look-up table. The algorithm then determines a yaw rate gain multiplier $G_{mYR}$ at box 150.

Figure 11:
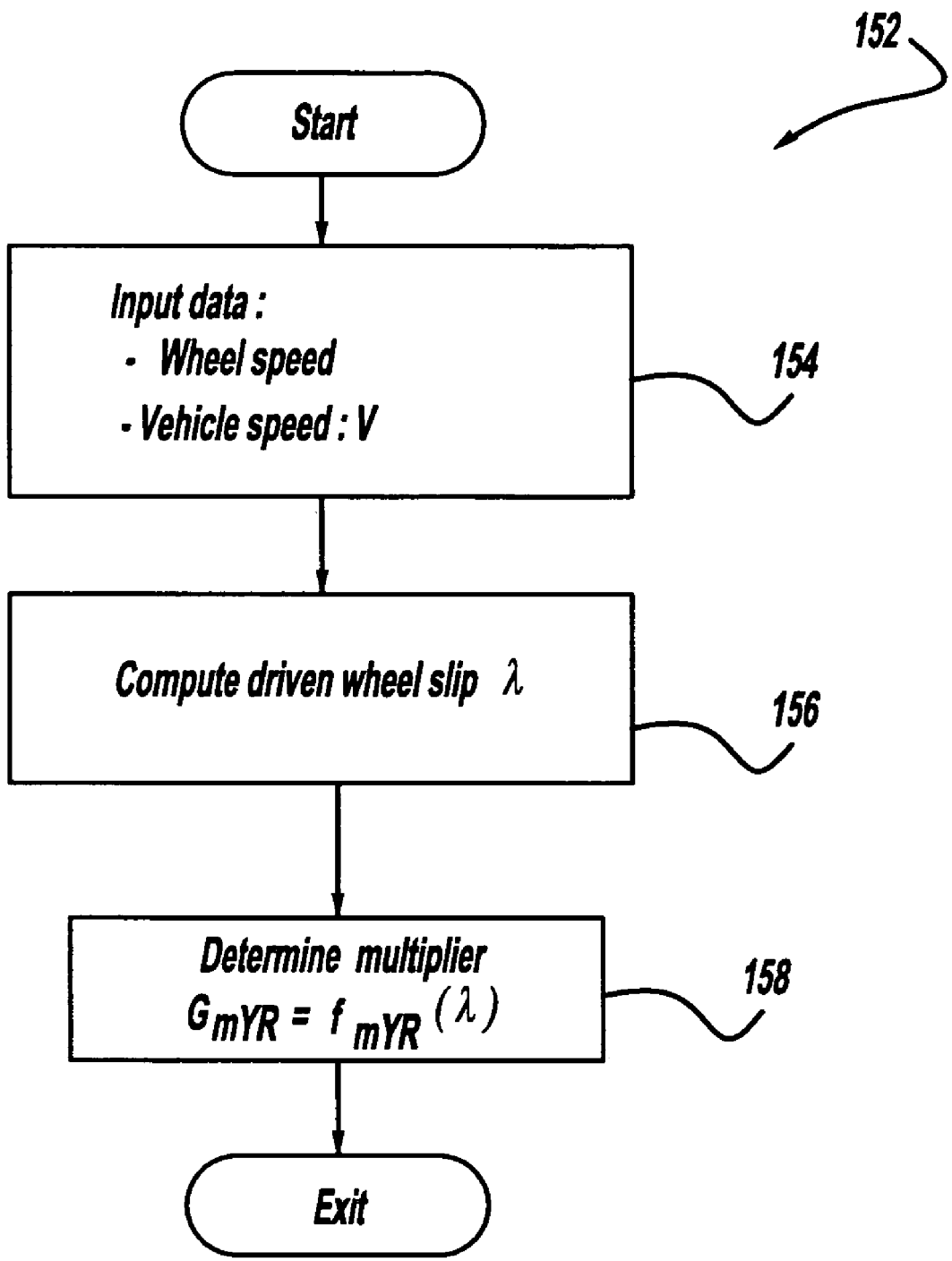
FIG. 11 is a flow chart diagram for determining a gain multiplier for the yaw rate feedback process block shown in FIG. 9.
Figure 12:
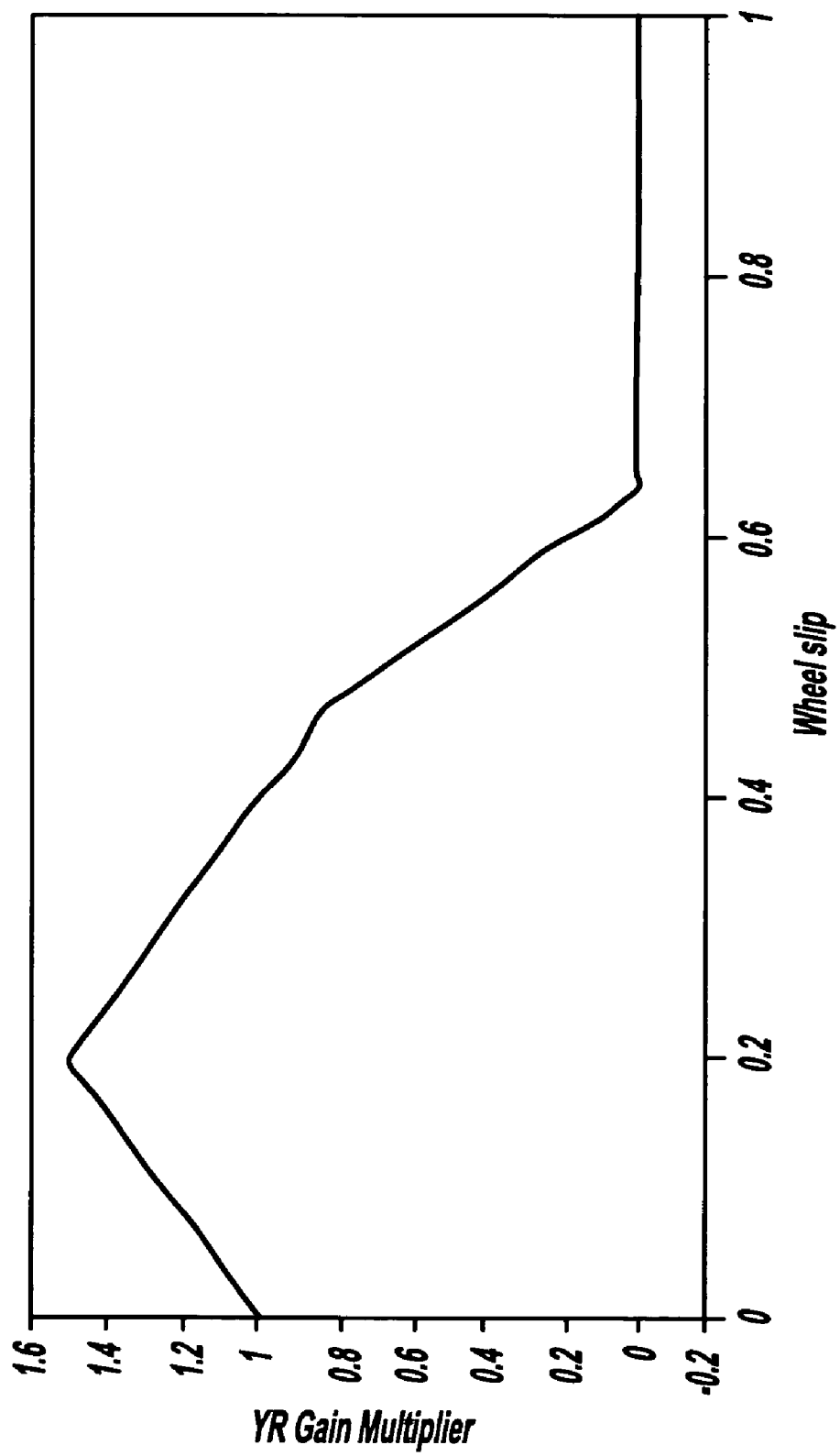
FIG. 12 is a graph with wheel slip on the horizontal axis and yaw rate gain multiplier on the vertical axis for selecting the gain multiplier for the flow chart diagram shown in FIG. 11.

FIG. 11 is a flow chart diagram 152 showing how the yaw rate gain multiplier $G_{mYR}$ is calculated. The driven wheel speed signal and the vehicle speed signal V are provided at box 154, and the algorithm computes the driven wheel slip λ at box 156 from these values. The algorithm then determines the yaw rate gain multiplier $G_{mYR}$ from the wheel slip λ at box 158. FIG. 12 is a graph with wheel slip λ on the horizontal axis and yaw rate gain multiplier $G_{mYR}$ on the vertical axis from which a look-up table can be generated for this purpose. From the calculated wheel slip λ, the algorithm identifies the yaw rate gain multiplier $G_{mYR}$. The proportional control algorithm determines the rear-wheel steering proportional control signal $RW_{YRp}$ at box 160 by multiplying the gain signal $G_{pYR}$, the error rate signal Δr and the multiplier $G_{mYR}$.

Figure 13:
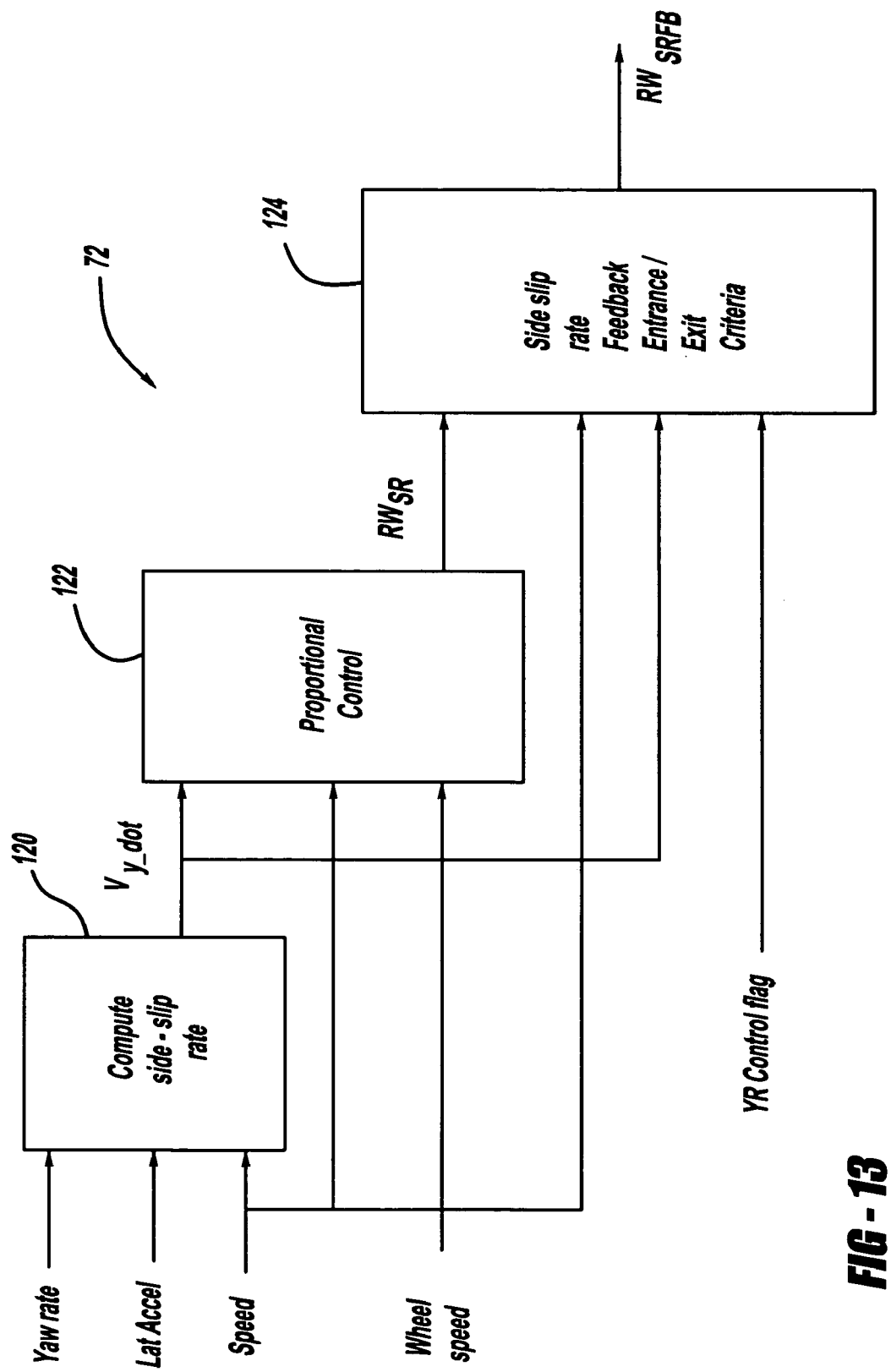
FIG. 13 is a block diagram of a side-slip rate feedback process block in the controller shown in FIG. 3, according to another embodiment of the present invention.

FIG. 13 is a detailed block diagram of the side-slip rate control process block 72 showing this embodiment of the invention. In this embodiment, the proportional control process block 122 receives the driven wheel speed signal instead of the ABS and TCS status signals. Therefore, the proportional control process block 122 determines the rear-wheel side-slip rate control component $RW_{SR}$ based on the driven wheel speed.

Figure 14:
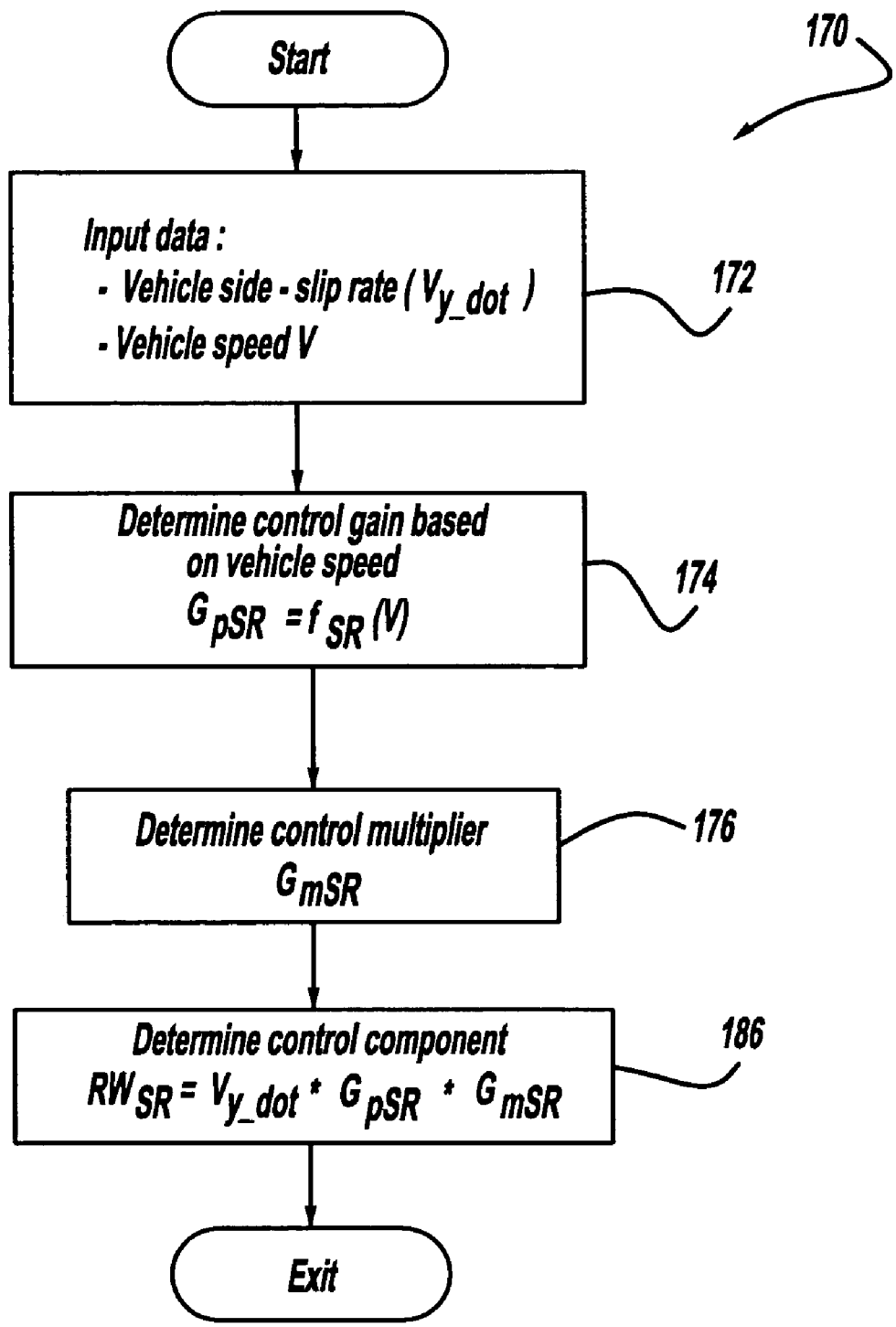
FIG. 14 is a flow chart diagram for determining a control component for the side-slip rate feedback process block shown in FIG. 13.

FIG. 14 is a flow chart diagram 170 showing the steps the proportional control algorithm performs to determine the rear-wheel side-slip rate control component $RW_{SR}$ based on the driven wheel speed for this embodiment. The proportional control algorithm receives input data of the vehicle side-slip rate signal $V_{y\_dot}$, the driven wheel speed and the vehicle speed V at box 172. The proportional control algorithm then determines a proportional side-slip rate control gain $G_{pSR}$ based on the vehicle speed $f_{SR}(V)$ at box 174 from a predetermined stored look-up table. The algorithm then determines a side-slip rate gain multiplier $G_{mSR}$ at box 176.

Figure 15:
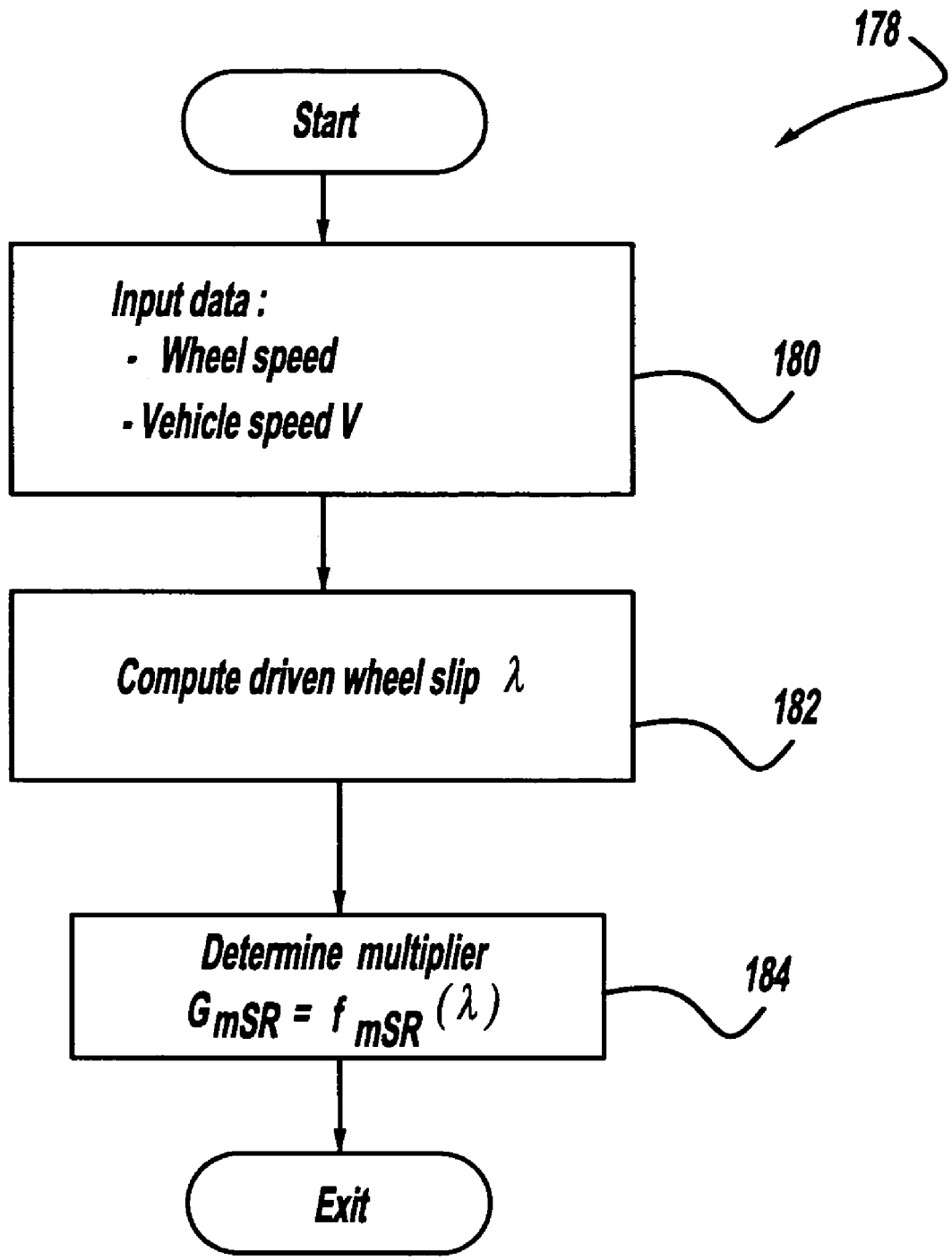
FIG. 15 is a flow chart diagram for determining a gain multiplier for the side-slip rate feedback process block shown in FIG. 13.
Figure 16:
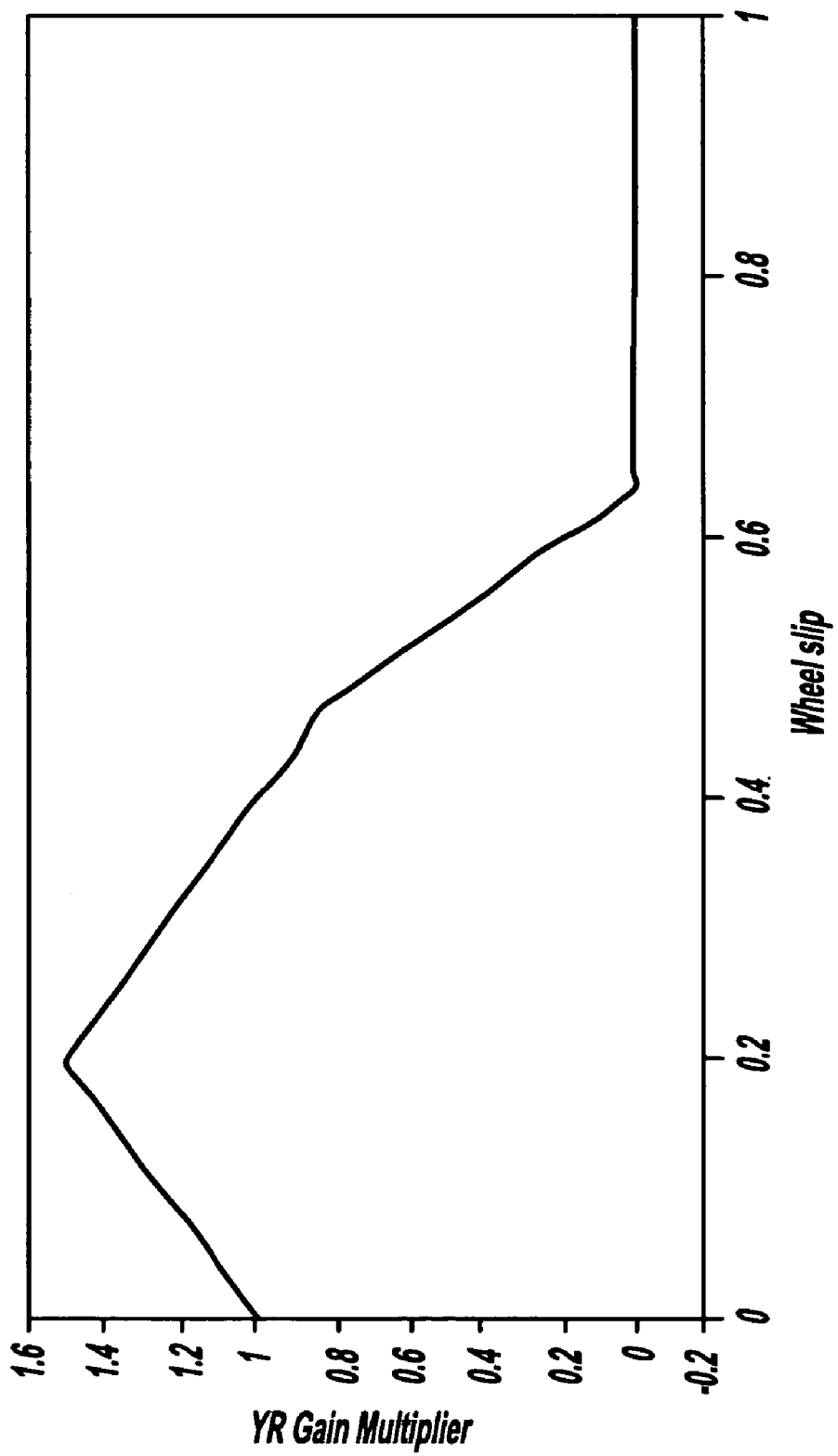
FIG. 16 is a graph with wheel slip on the horizontal axis and side-slip gain multiplier on the vertical axis for selecting the gain multiplier for the flow chart diagram shown in FIG. 15.

FIG. 15 is a flow chart diagram 178 showing how the side-slip rate gain multiplier $G_{mSR}$ is calculated. The driven wheel speed signal and the vehicle speed signal V are provided at box 180, and the algorithm computes the driven wheel slip λ at box 182 from these values. The algorithm then determines the side-slip rate gain multiplier $G_{mSR}$ from the wheel slip λ at box 184. FIG. 16 is a graph with wheel slip λ on the horizontal axis and side-slip rate gain multiplier $G_{mSR}$ on the vertical axis from which a look-up table can be generated for this purpose. From the calculated wheel slip λ, the algorithm identifies the side-slip rate gain multiplier $G_{mSR}$. The proportional control algorithm determines the rear-wheel side-slip rate control component $RW_{SR}$ at box

186 by multiplying the gain signal $G_{pSR}$, the vehicle side-slip rate signal $V_{y\_dot}$ and the multiplier $G_{mSR}$.

In yet another embodiment, the controller can use all of the ABS signal, the TCS signal and the driven wheel speed signal to provide wheel longitudinal slip inputs to more accurately provide the rear-wheel gain signal. Such a system may use the ABS and the TCS signals or the driven wheel speed signal for fault tolerance purposes.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for providing active rear-wheel steering for a vehicle, said system comprising:
   an open-loop controller configured to generate an open-loop steering control signal;
   a yaw rate feedback controller configured to generate a yaw rate feedback signal, said yaw rate feedback controller including a yaw rate proportional control process block that generates a rear-wheel steering proportional control signal for determining the yaw rate feedback signal, wherein the yaw rate proportional control process block determines the rear-wheel steering proportional control signal based on at least one wheel longitudinal slip input signal from one or more of wheel speed, automatic braking system on or off, and traction control system on or off;
   a side-slip rate feedback controller configured to generate a side-slip rate feedback signal, said side-slip rate feedback controller including a side-slip rate proportional control process block that generates a side-slip rate control component signal for determining the side-slip rate feedback signal, wherein the side-slip rate proportional control process block determines the side-slip rate control component signal based on at least one wheel longitudinal slip input signal from one or more of wheel speed, automatic braking system on or off, and traction control system on or off; and
   a combiner configured to combine the open-loop steering control signal, the yaw rate feedback signal and the side-slip rate feedback signal to generate a rear-wheel steering control signal for steering the rear wheels of the vehicle.

2. The control system according to claim 1 wherein the yaw rate proportional control process block determines a control gain based on vehicle speed, determines whether the automatic braking system is on or off, determines whether the traction control system is on or off, selects a first predetermined multiplier if both the automatic braking system and the traction control system are off, selects a second predetermined multiplier if either of the automatic braking system or the traction control system is on, and calculates the rear-wheel steering proportional control signal based on a yaw rate error signal, the control gain and the first or second multiplier, wherein the yaw rate error signal is the difference between a commanded vehicle yaw rate and a measured vehicle yaw rate.

3. The control system according to claim 1 wherein the yaw rate proportional control process block determines a control gain based on vehicle speed and determines the rear-wheel steering proportional control signal based on a yaw rate error signal, the control gain and a predetermined multiplier, wherein the yaw rate error signal is the difference between a commanded vehicle yaw rate and a measured vehicle yaw rate.

4. The control system according to claim 3 wherein the yaw rate proportional control process block calculates a wheel slip value based on the difference between the wheel speed and the vehicle speed, and determines the multiplier from the calculated wheel slip value.

5. The control system according to claim 4 wherein the multiplier is determined from a look-up table when the wheel slip value is computed.

6. The control system according to claim 1 wherein the side-slip rate proportional control process block determines a control gain based on vehicle speed, determines whether the automatic braking system is on or off, determines whether the traction control system is on or off, selects a first predetermined multiplier if the automatic braking system and the traction control system are both off, selects a second predetermined multiplier if either of the automatic braking system or the traction control system is on, and determines the side-slip rate control component signal based on a vehicle side-slip rate, the control gain and the first or second predetermined multiplier.

7. The control system according to claim 6 wherein the vehicle side-slip rate is determined based on a vehicle lateral acceleration measurement.

8. The control system according to claim 1 wherein the side-slip rate proportional control process block determines the control gain based on vehicle speed, determines a control multiplier and determines the side-slip rate control component signal based on the vehicle side-slip rate, the control gain and the multiplier.

9. The control system according to claim 8 wherein the vehicle side-slip rate is based on a vehicle lateral acceleration measurement.

10. The control system according to claim 8 wherein the side-slip rate proportional control process block calculates a wheel slip value based on the difference between the wheel speed and the vehicle speed, and determines the multiplier from the calculated wheel slip value.

11. The control system according to claim 10 wherein the multiplier is determined from a look-up table.

12. A control system for providing active steering for a vehicle, said system comprising:
    an open-loop controller configured to generate an open-loop steering control signal;
    a yaw rate feedback controller configured to generate a yaw rate feedback signal based on a yaw rate error signal and at least one longitudinal wheel slip input value, said yaw rate error signal being the difference between a commanded yaw rate signal and a yaw rate measurement signal;
    a side-slip rate feedback controller configured to generate a side-slip rate feedback signal based on at least one longitudinal wheel slip input value, a lateral acceleration signal, the yaw rate measurement signal and a vehicle speed signal; and
    a combiner configured to combine the open-loop steering control signal, the yaw rate feedback signal and the side-slip rate feedback signal to generate a wheel steering control signal to steer the vehicle wheels.

13. The control system according to claim 12 wherein the longitudinal wheel slip input values are selected from the group consisting of a wheel speed value, an automatic braking system on or off signal and a traction control system on or off signal.

14. The control system according to claim 13 wherein the yaw rate feed back controller includes a yaw rate proportional control process block that generates a wheel steering proportional control signal to determine the yaw rate feedback signal, wherein the yaw rate proportional control process block determines a control gain based on vehicle speed, determines whether the automatic braking system is on or off, determines whether the traction control system is on or off, selects a first predetermined multiplier if both the automatic braking system and the traction control system are off, selects a second predetermined multiplier if either of the automatic braking system or the traction and control system is on, and calculates the wheel steering proportional control signal based on a yaw rate error signal, the control gain and the first or second predetermined multiplier, wherein the yaw rate error signal is the difference between the commanded yaw rate and a measured rate.

15. The control system according to claim 13 wherein the yaw rate feed back controller includes a yaw rate proportional control process block that generates a wheel steering proportional control signal to determine the yaw rate feed back signal, wherein the yaw rate proportional control process block determines a control gain based on vehicle speed and determines the wheel steering proportional control signal based on a yaw rate error signal, the control gain and a predetermined control multiplier, wherein the yaw rate error signal is the difference between a commanded vehicle yaw rate and a measured vehicle yaw rate.

16. The control system according to claim 15 wherein the yaw rate proportional control process block calculates a wheel slip value based on the difference between the wheel speed value and the vehicle speed, and determines the multiplier from the calculated wheel slip value.

17. The control system according to claim 13 wherein the side-slip rate feedback controller includes a side-slip rate proportional control process block that generates a wheel side-slip rate control component signal to determine the side-slip rate feedback signal, wherein the side-slip rate proportional control process block determines a control gain based on vehicle speed, determines whether the automatic braking system is on or off, determines whether the traction control system is on or off, selects a first predetermined multiplier if the automatic braking system and the traction control system are both off, selects a second predetermined multiplier if either of the automatic braking system or the traction control system is on, and determines the wheel side-slip rate control component signal based on a vehicle side-slip rate, the control gain and the first or second predetermined multiplier.

18. The control system according to claim 17 wherein the side-slip rate proportional control process block determines the control gain based on vehicle speed, determines a control multiplier and determines the wheel side-slip rate control component signal based on the vehicle side-slip rate, the control gain and the multiplier.

19. The control system according to claim 18 wherein the side-slip rate proportional control process block calculates a wheel slip value based on the wheel speed and the vehicle speed, and determines the multiplier from the computer wheel slip value.

20. A method for active steering of the rear-wheels of a vehicle, said method comprising:
generating an open-loop steering control signal;
generating a yaw rate feedback signal based on wheel longitudinal slip;
generating a side-slip rate feedback signal based on the wheel longitudinal slip; and
combining the open-loop steering control signal, the yaw rate feedback signal and the side-slip rate feedback signal to generate a rear-wheel steering control signal to steer the vehicle's rear wheels.

21. The method according to claim 20 wherein generating the yaw rate feedback signal and the side-slip rate feedback signal includes using one or more of wheel speed, automatic braking system on or off, and traction control system on or off for the wheel longitudinal slip.

22. The method according to claim 20 wherein generating a yaw rate feedback control signal includes determining a control gain based on vehicle speed, determining whether the automatic braking system is on or off, determining whether the traction control system is on or off, selecting a first predetermined multiplier if both the automatic braking system and the traction control system are off, selecting a second predetermined multiplier if either of the automatic braking system or the traction control system is on, calculating a wheel steering proportional control signal based on a yaw rate error signal, the control gain and the first or second predetermined multiplier, wherein the yaw rate error signal is the difference between a commanded vehicle yaw rate and a measured vehicle yaw rate.

23. The method according to claim 20 wherein generating a yaw rate feedback signal includes determining a control gain based on vehicle speed, determining a multiplier, and determining a wheel steering proportional control signal based on a yaw rate error signal, the control gain and a predetermined multiplier, wherein the wheel steering proportional control signal is used to determine the yaw rate feedback signal, and wherein the yaw rate error signal is the difference between a commanded yaw rate and a measured vehicle yaw rate.

24. The method according to claim 23 wherein determining a multiplier includes calculating a wheel slip value based on the difference between a wheel speed and the vehicle speed, and determining the multiplier from the calculated wheel slip value.

25. The method according to claim 20 wherein generating a side-slip rate feedback signal includes determining a control gain based on vehicle speed, determining whether an automatic braking system is on or off, determining whether a traction control system is on or off, selecting a first predetermined multiplier if the automatic braking system and the traction control system are both off, selecting a second predetermined multiplier if either of the automatic braking system or the traction control system is on, and determining a side-slip rate control component signal based on a vehicle side-slip rate, the control gain and the first or second predetermined multiplier, wherein the side-slip rate control component signal is used to determine the side-slip rate feedback signal.

26. The method according to claim 20 wherein generating a side-slip rate feedback signal includes determining a control gain based on vehicle speed, determining a multiplier, and determining a side-slip rate control component signal based on a vehicle side-slip rate, the control gain and the multiplier, and wherein the side-slip rate control component signal is used to determine the side-slip rate feedback signal.

27. The method according to claim 26 wherein determining a mulitplier includes calculating a wheel slip value based on the difference between a wheel speed and the vehicle speed, and determining the multiplier from the computed wheel slip value.

* * * * *